United States Patent [19]

Taylor

[11] Patent Number: 4,681,362
[45] Date of Patent: Jul. 21, 1987

[54] TOP FOR MOTORCYCLES AND SNOWMOBILES

[76] Inventor: Jimmie Taylor, 7002 Industrial Ave., Flint, Mich. 48505

[21] Appl. No.: 837,834

[22] Filed: Mar. 10, 1986

[51] Int. Cl.⁴ .............................................. B60J 7/00
[52] U.S. Cl. ................................ 296/78.1; 280/289 S; 296/1 S
[58] Field of Search ...................... 296/78.1, 102, 1 S; 135/88; 280/289 S

[56] References Cited

U.S. PATENT DOCUMENTS 3,301,589   1/1967   Hayden .............................. 296/78.1
4,440,436   4/1984   Giddens et al. ..................... 296/78.1

Primary Examiner—Robert R. Song
Attorney, Agent, or Firm—Harry R. Dumont

[57] ABSTRACT

The top and canopy are removably mounted on a vehicle and include a pair of loop tubes that are fastened to the body of the vehicle and to the windshield of the vehicle. The rear flap of the canopy includes a plurality of air vents to provide aerodynamic stability of the vehicle at high speeds.

4 Claims, 5 Drawing Figures

FIG. 4
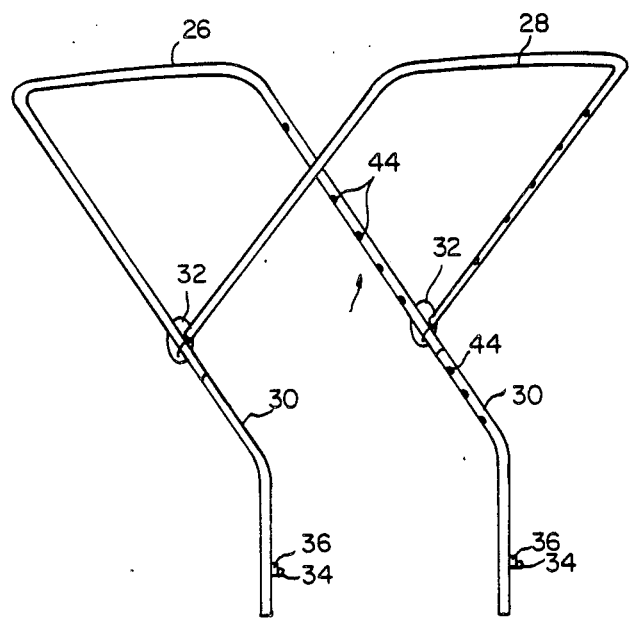
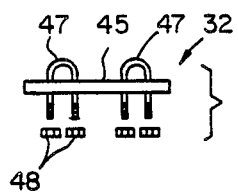
FIG. 5

TOP FOR MOTORCYCLES AND SNOWMOBILES

BACKGROUND OF THE INVENTION

Field of the Invention

The invention relates to a top for motorcycles, snowmobiles and similar vehicles. The top is removably mounted on the vehicle and has a lightweight and simple construction that allows for easy removal of the top when it is not desired in use. The rear flap of the canopy includes a plurality of selectively placed air vents to allow free passage of air through these flaps at relatively high speeds.

SUMMARY OF THE INVENTION

The invention relates to a simple and lightweight bolt on top that will provide the riders of motorcycles and other vehicles comfort and dry conditions in bad weather.

The construction of the canopy rear flap allows for good visibility and for free passage of air to provide stable operation of the vehicle at high speed conditions.

BRIEF DESCRIPTION OF THE DRAWINGS

The preferred embodiment of the invention is shown in the accompanying sketches in which like numerals are used to identify like elements as they may appear in the several different figures and in which:

FIG. 4 is a view of the top with canopy removed showing frame construction; and

FIG. 5 is a front elevational view of one of the fastening means used in the frame.

DETAILED DESCRIPTION OF THE PREFERRED EMBODIMENT

Figure 1:
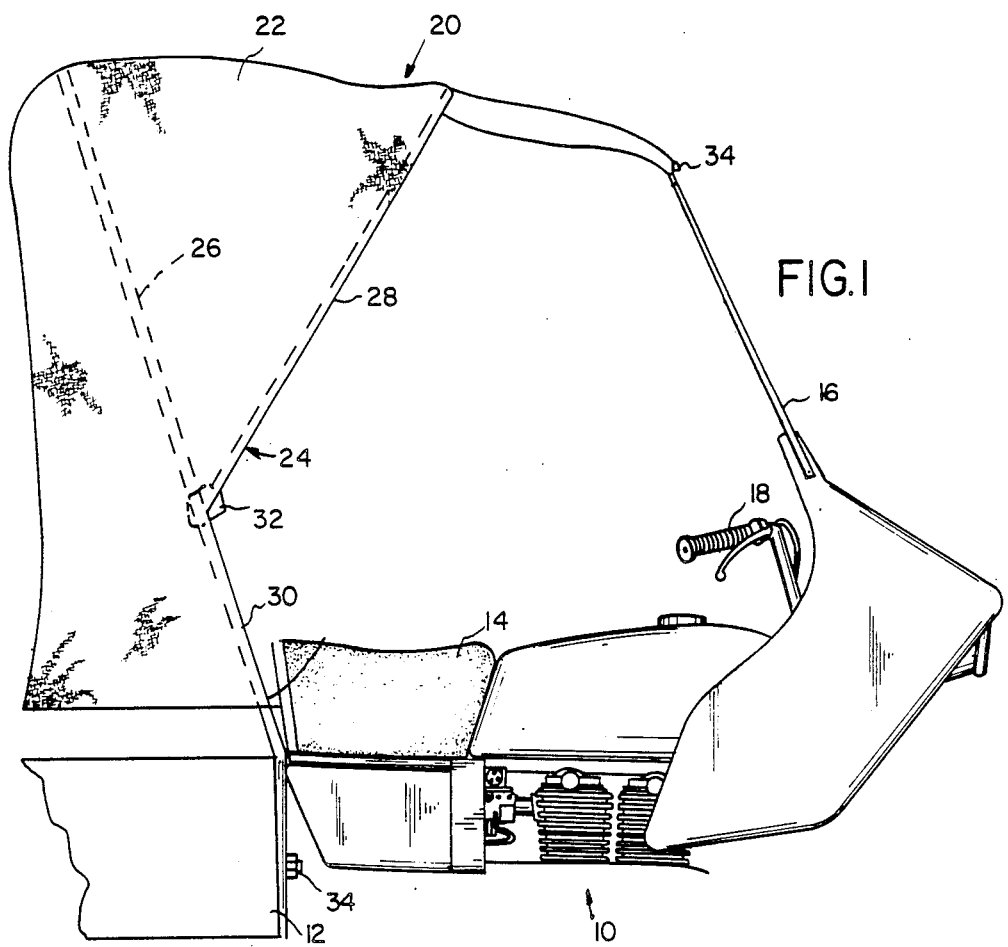
FIG. 1 is a side elevational view of a top with parts broken away and shown attached to a motorcycle.

Now referring to FIG. 1, the top is shown attached to the motorcycle 10 with its principal parts shown and including frame 12, seat 14, windshield 16 and handlebar 18. The top is indicated generally by the numeral 20 and includes a fabric canopy 22 and a frame assembly 24. The frame assembly 24 includes a rear tube loop 26 and a forward tube loop 28 with a lower extension leg 30. A bolt fastener 32 is included to provide for attachment of the lower end of the leg 30 to the frame 12 or other part of the motorcycle 10. The forward end of the canopy 22 is attached by a plurality of snap fasteners 34 to the upper edge of the windshield 16.

Figure 2:
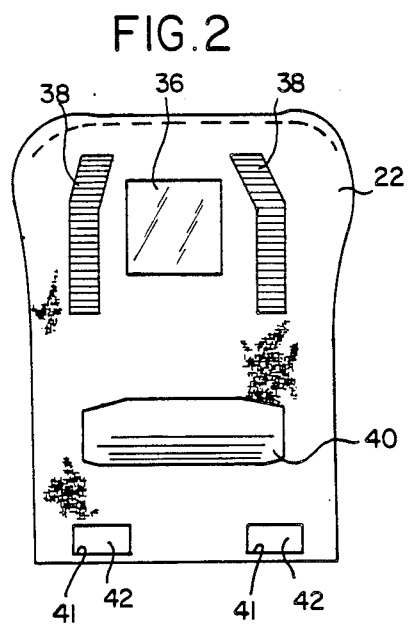
FIG. 2 is a rear view of the canopy showing its rear flap.
Figure 3:
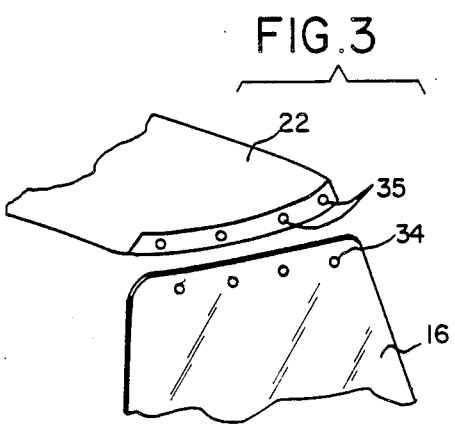
FIG. 3 is a fragmentary view showing the vehicle windshield at the forward end of the canopy just prior to attachment.

FIG. 2 shows the rear flap of the canopy 22 which has attached to it a central window 36. A pair of upper air vents 38 are included in the rear flap and a lower air vent 40 is also provided in the manner shown. A pair of openings 41 rectangular in shape are also included in the rear flap to uncover the tail lights 42. As shown in FIG. 3, the forward end of the canopy 22 includes spaced extensions 35 which are attached to the snap fasteners 34 mounted to the upper edge of the windshield 16.

FIG. 4 shows the frame 24 with the canopy 22 removed to better show its mode of construction. The frame 24 is shown to include the rearward loop 26 and the upward loop 28 both of which provide support for the canopy 22. The loops 26 and 28 may be constructed of aluminum or other light material to reduce the overall weight of the top. A plurality of snap fasteners 44 are included at the inner surface of the loop 26 and at the inner surface of the loop 28 so that these may be engaged by corresponding openings formed in the rims of the canopy 22. The lower extension legs 30 likewise include a plurality of snap fasteners 44 on their inner surface to engage the opposed lips of the canopy 22 for fastening. Fastening means 32 for holding the loops 26 and 28 together proximate their end points are shown in place. The fastening means 32 are better shown in FIG. 5 and include a plate 45 with a pair of double ended bolts 47 and nuts 48 for holding the respective tubes 26 and 28 together in a rigid holding relationship. The lower ends of the extension plate 30 are attached by bolts 34 and nust 36 to abutting parts of the frame 12 on the motorcycle 10. The extension legs 30 are attached to the lower ends of tubes 26 and 28 by telescoping fitting or by other attachment means.

It will be seen that by simple attachment of the bolts 34 and bolt fasteners 32 and by clipping of the forward edge of the canopy to the windshield 16, it is possible to completely mount the top 20 and clip the canopy 22 over the framework. An important feature of the invention is the construction of the rear flap of the canopy 22 with the arrangement of the two upper side air vents 38 and the lower air vent 40 to allow free passage of air at high speeds of the vehicle. The aerodynamics of the vehicle and top are greatly improved by this construction.

It will thus be seen that I have provided by my invention a lightweight and easily installed top for motorcycles and the like with improved aerodynamics at high speed.

I claim:

1. A removable top for vehicles including a body and a windshield, comprising;
   a first loop connectable at its bottom to the vehicle body and a second loop connected to said first loop and inclined in a forward direction said loops comprising tubular metal members; and a canopy further connected over said loops and having its forward end connected to said windshield of said vehicle, said canopy having in its rear end symmetrically arranged vented openings including a pair of upper laterally spaced vented openings and a lower vented opening.

2. The combination as set forth in claim 1 in which said canopy includes a plurality of snap fasteners for connecting it to said vehicle windshield.

3. The combinaiton as set forth in claim 1 in which said tubes are connected one to the other by a plurality of bolt fasteners.

4. The combination as set forth in claim 1 in which a further opening having a transparent viewing aperature is further connected to said rear canopy.

* * * * *